United States Patent
Dong

(10) Patent No.: US 10,923,897 B2
(45) Date of Patent: Feb. 16, 2021

(54) CABLE SEALING GLAND

(71) Applicant: Pentair Flow Services Ag, Schaffhausen (CH)

(72) Inventor: Wesley Dong, Belmont, CA (US)

(73) Assignee: Pentair Flow Services AG, Schaffhausen (CH)

( * ) Notice: Subject to any disclaimer, the term of this patent is extended or adjusted under 35 U.S.C. 154(b) by 344 days.

(21) Appl. No.: 15/926,939

(22) Filed: Mar. 20, 2018

(65) Prior Publication Data
US 2018/0269674 A1 Sep. 20, 2018

Related U.S. Application Data

(60) Provisional application No. 62/473,833, filed on Mar. 20, 2017.

(51) Int. Cl.
| *H02G 15/013* | (2006.01) |
| *H02G 15/06* | (2006.01) |
| *H02G 3/06* | (2006.01) |
| *H02G 3/08* | (2006.01) |

(52) U.S. Cl.
CPC ......... *H02G 15/013* (2013.01); *H02G 3/0658* (2013.01); *H02G 15/06* (2013.01); *H02G 3/0675* (2013.01); *H02G 3/083* (2013.01)

(58) Field of Classification Search
CPC .... H02G 15/013; H02G 15/06; H02G 3/0658; H02G 3/0675; H02G 3/083
USPC .................................................. 29/747, 748
See application file for complete search history.

(56) References Cited

U.S. PATENT DOCUMENTS

| 2,258,365 | A | * | 10/1941 | Mills | H02G 3/0658 |
| | | | | | 174/51 |
| 2,858,358 | A | | 10/1958 | Hawke | |
| 3,040,284 | A | * | 6/1962 | Connell | H01B 7/16 |
| | | | | | 439/320 |
| 3,101,204 | A | | 8/1963 | Pratley | |
| 3,622,939 | A | * | 11/1971 | Forney, Jr. | H01R 9/0521 |
| | | | | | 439/322 |
| 4,169,967 | A | | 10/1979 | Bachle | |
| 4,376,873 | A | | 3/1983 | Lackinger | |

(Continued)

FOREIGN PATENT DOCUMENTS

| CN | 105466651 A | 4/2016 |
| DE | 202013003600 U1 | 8/2014 |

(Continued)

*Primary Examiner* — Peter Dungba Vo
*Assistant Examiner* — Kaying Kue
(74) *Attorney, Agent, or Firm* — Quarles & Brady LLP

(57) ABSTRACT

A cable sealing gland and method for securing a cable to an enclosure. The cable sealing gland includes a gland connector configured to be coupled to the cable, having a cable gland body sized to fit over the cable and including a first end sized to remain outside the enclosure when the gland connector is inserted through a hole of the enclosure and a second end sized to extend into an interior of the enclosure when the gland connector is inserted through the hole. The gland connector also includes a ferrule sized to fit inside the cable gland body, and a compression bolt configured to engage the cable gland body to compress the ferrule onto the cable. The cable sealing gland also includes a locknut configured to engage the cable gland body to couple the gland connector to the enclosure.

18 Claims, 7 Drawing Sheets

(56) References Cited

U.S. PATENT DOCUMENTS

| | | | |
|---|---|---|---|
| 4,493,522 A | | 1/1985 | Law |
| 4,575,274 A | * | 3/1986 | Hayward .................. F16D 9/08 |
| | | | 174/75 C |
| 4,629,825 A | | 12/1986 | Lackinger |
| 4,692,563 A | | 9/1987 | Lackinger |
| 4,789,759 A | * | 12/1988 | Jones ........................ F16B 9/02 |
| | | | 174/655 |
| 5,310,963 A | | 5/1994 | Kennelly |
| 5,589,663 A | | 12/1996 | Wales |
| 5,600,094 A | * | 2/1997 | McCabe .................... F16L 5/06 |
| | | | 174/653 |
| 5,621,191 A | * | 4/1997 | Norris .................... H02G 15/04 |
| | | | 174/653 |
| 5,648,639 A | | 7/1997 | Hand |
| 5,691,505 A | * | 11/1997 | Norris .................... H01R 4/646 |
| | | | 174/51 |
| 6,034,325 A | | 3/2000 | Nattel et al. |
| 6,268,565 B1 | * | 7/2001 | Daoud ................. G02B 6/4471 |
| | | | 174/657 |
| 6,596,939 B1 | * | 7/2003 | Gretz ........................ F16L 5/00 |
| | | | 174/152 G |
| RE38,294 E | | 11/2003 | Nattel et al. |
| 6,935,886 B2 | | 8/2005 | Hoch et al. |
| 7,854,627 B1 | * | 12/2010 | Gretz ...................... H02G 3/083 |
| | | | 439/557 |
| 7,909,366 B1 | * | 3/2011 | Hall ...................... A63B 69/125 |
| | | | 285/205 |
| 7,914,048 B2 | | 3/2011 | Shemtov |
| 8,013,250 B2 | | 9/2011 | Hurrell et al. |
| 8,134,088 B2 | | 3/2012 | Naumann et al. |
| 8,690,599 B2 | | 4/2014 | Bartholoma et al. |
| 8,692,139 B2 | | 4/2014 | Aldrich et al. |
| 8,736,784 B2 | | 5/2014 | Hausler et al. |
| 8,845,361 B2 | | 9/2014 | Magno, Jr. et al. |
| 8,979,557 B2 | * | 3/2015 | Dinh .................... H02G 3/0691 |
| | | | 439/100 |
| 9,054,433 B2 | | 6/2015 | Corbett et al. |
| 9,231,397 B2 | | 1/2016 | Chiu |
| 9,236,718 B2 | | 1/2016 | Jung |
| 9,312,672 B2 | * | 4/2016 | Hill ...................... H02G 3/0675 |
| 9,350,154 B2 | * | 5/2016 | Dinh .................... H02G 3/0691 |
| 9,490,619 B2 | * | 11/2016 | Smith .................... H02G 3/088 |
| 9,601,914 B2 | | 3/2017 | Chiu |
| 9,704,620 B2 | * | 7/2017 | Martins Neto ...... H02G 15/013 |
| 9,831,649 B1 | * | 11/2017 | Gretz ...................... H02G 3/088 |
| 10,418,748 B2 | * | 9/2019 | Wang ...................... H02G 15/10 |
| 10,487,972 B1 | * | 11/2019 | Price ...................... F16L 33/227 |
| 10,594,127 B2 | * | 3/2020 | Portillo Gallego .. H02G 15/013 |
| 2004/0251687 A1 | * | 12/2004 | Chelchowski ...... F16L 19/0231 |
| | | | 285/354 |
| 2005/0104372 A1 | * | 5/2005 | Auray .................. F16L 19/063 |
| | | | 285/139.1 |
| 2006/0045428 A1 | * | 3/2006 | Theuerkorn ......... G02B 6/3847 |
| | | | 385/53 |
| 2009/0130955 A1 | * | 5/2009 | Na ........................ B24B 37/345 |
| | | | 451/6 |
| 2010/0181728 A1 | * | 7/2010 | Thompson ............... H02G 3/22 |
| | | | 277/314 |
| 2010/0307816 A1 | * | 12/2010 | Hurrell ................ H02G 15/013 |
| | | | 174/650 |
| 2010/0326700 A1 | * | 12/2010 | Xu ........................ H02G 3/0691 |
| | | | 174/163 R |
| 2013/0118803 A1 | | 5/2013 | Mango, Jr. |
| 2014/0030903 A1 | | 1/2014 | Magno et al. |
| 2015/0083486 A1 | * | 3/2015 | Hill ........................ H02G 3/088 |
| | | | 174/653 |
| 2015/0155079 A1 | * | 6/2015 | Martins Neto ...... H01B 17/586 |
| | | | 174/153 R |
| 2015/0162718 A1 | | 6/2015 | Dinh |
| 2015/0222107 A1 | | 8/2015 | Jackson |
| 2016/0064914 A1 | | 3/2016 | Janvrin et al. |
| 2016/0247609 A1 | | 8/2016 | Wang et al. |
| 2017/0117696 A1 | | 4/2017 | Chiu |

FOREIGN PATENT DOCUMENTS

| | | |
|---|---|---|
| EP | 2950125 A1 | 2/2015 |
| GB | 2219697 A | 12/1989 |
| GB | 2523098 A | 8/2015 |
| KR | 101318238 B1 | 10/2013 |
| KR | 101428771 B1 | 8/2014 |
| KR | 101608174 B1 | 3/2016 |
| KR | 20160041214 A | 4/2016 |
| WO | 2008074965 A1 | 6/2008 |
| WO | 2011135425 A1 | 11/2011 |
| WO | 2013185875 A3 | 3/2013 |
| WO | 2012159760 A3 | 9/2013 |
| WO | 2014108691 A1 | 7/2014 |
| WO | 2016058331 A1 | 4/2016 |

* cited by examiner

CABLE SEALING GLAND

RELATED APPLICATIONS

This application claims priority under 35 U.S.C. § 119 to U.S. Provisional Patent Application No. 62/473,833 filed on Mar. 20, 2017, the entire contents of which is incorporated herein by reference.

BACKGROUND OF THE INVENTION

Mineral Insulated (MI) cables generally include one or more conductors surrounded by mineral insulation, such as magnesium oxide powder, which is tightly packed inside a conductive, typically copper or steel, tubular sheath. With this construction, MI cables are compact, fire-resistant, and protected from electromagnetic interference. As such, MI cables are often used in applications where high power output, high exposure temperatures, or extreme resistance to environmental corrosives are needed. For example, these cables are often used in wiring systems where enhanced fire protection of electrical connections is necessary, such as fire and smoke alarm systems.

An MI cable is terminated (e.g., to electrically connect the cable to, for example, control equipment or a power supply) by stripping away the sheath and exposing the conductors. To protect the termination from the surrounding environment, the exposed insulation is sealed against ingress of outside substances. For further protection, MI cables are often routed into electrical enclosures so that the terminated end resides within the electrical enclosure.

Generally, a cable sealing gland is used to terminate and seal the cable, secure the cable to an enclosure, and/or provide a ground connection from the sheath to the enclosure. For example, FIG. 1 shows an existing cable sealing gland 10 securing a terminated end 12 of a cable 14 within an enclosure 16. As shown in FIGS. 1 and 2A, the cable sealing gland 10 includes a cable gland connector 18, one or more locknuts 20, a sealing pot 22, and potting compound (not shown). The cable gland connector 18 includes a gland nut 24, a compression sleeve 26, and a gland body 28. These three components are assembled together by placing the compression sleeve 26 inside the gland nut 24, and threading the gland nut 24 onto a first end 30 of the gland body 28.

To terminate and install the cable 14, the assembled cable gland connector 18 is first placed on the cable end 12 so that the gland body 28 faces the cable end 12, as shown in FIG. 2B. The cable end 12 is then terminated by stripping the sheath 32 and wiping any remaining insulation 34 off the exposed connectors 36. Once the exposed connectors 36 are cleaned, the exposed insulation 34 is sealed by placing the sealing pot 22 on the stripped end 12 over the exposed insulation and setting the sealing compound within the sealing pot 22.

Once sealed, the cable end 12 is routed through a hole 40 of the enclosure 16 until the a second end 38 of the gland body 28 reaches an outer surface 42 of the enclosure 16. As shown in FIG. 2A, the second end 38 is threaded (e.g., NPT tapered pipe thread form), and the hole 40 can be a threaded, or NPT tapered, hole. As a result, once the cable end 12 is routed through the hole 40, the second end 38 can be tightened into the hole 40. The tapers of the second end 38 and the hole 40 can seal this connection. Then, the gland nut 24 is tightened against the gland body 28 from the outside of the enclosure 16 (i.e., by rotating the gland nut 24) to ensure that the connector 18 is secured in place along the cable end 12.

As shown in FIG. 1, when assembled and installed, a majority of the cable gland connector 18 resides outside of the enclosure 16. In double-walled enclosures 16, such as that shown in FIG. 1, or insulated fire-rated enclosures, which are single- or doubled-walled and surrounded by up to two inches of thermal insulation, the gland nut 24 is difficult to access and special tooling or multiple wrenches are required to tighten the gland nut 24 onto the gland body 28. Therefore, what is needed is a cable sealing gland that affords better tool access for installing the gland on an enclosure.

SUMMARY OF THE INVENTION

The foregoing needs are met by the methods, apparatus, and/or systems for providing a cable sealing gland that seals and secures a cable to an enclosure. The cable sealing gland resides almost entirely within the interior of the enclosure when securing the cable to the enclosure, thus providing tooling access exclusively from the interior of the enclosure and also reducing heat transfer to the cable when the enclosure is externally exposed to heat, as compared to existing cable glands.

In one embodiment, a cable sealing gland for securing a cable to an enclosure is provided. The cable sealing gland includes a gland connector configured to be coupled to the cable. The gland connector includes a cable gland body, a ferrule, and a compression bolt. The cable gland body is sized to fit over the cable and includes a first end sized to remain outside the enclosure when the gland connector is inserted through a hole of the enclosure and a second end sized to extend into an interior of the enclosure when the gland connector is inserted through the hole. The ferrule is sized to fit over the cable inside the cable gland body, and the compression bolt is sized to fit over the cable and is configured to engage the cable gland body to compress the ferrule onto the cable. The cable sealing gland also includes a locknut configured to engage the cable gland body and engage an interior surface of the enclosure to couple the gland connector to the enclosure when the gland connector is inserted through the hole of the enclosure.

According to another embodiment, a method of securing a terminated end of a cable to an enclosure is provided. The method includes providing a gland connector with a cable gland body, a ferrule, and a compression bolt, and assembling the gland connector by placing the ferrule into a second end of the cable gland body and threading the compression bolt into the second end of the cable gland body. The method also includes placing the gland connector over the cable a distance away from the terminated end, securing the gland connector onto the cable by tightening the compression bolt against the cable gland body, and inserting the terminated end through a hole of the enclosure until a first end of the cable gland body is adjacent an outer surface of the enclosure and the second end of the cable gland body resides within an interior of the enclosure. The method further includes tightening a locknut against the second end of the cable gland body from the interior of the enclosure until the locknut engages an interior surface of the enclosure.

According to yet another embodiment, a method of securing a terminated end of a cable to an enclosure is provided. The cable can include a gland connector with a ferrule, a cable gland body, and a compression bolt adjacent the terminated end. The method includes aligning flat portions of a second end of the gland connector with flat portions of a hole of the enclosure and inserting the terminated end of the cable through the hole of the enclosure until a first end of the gland connector is adjacent an outer surface of the enclosure and the second end of the gland connector resides within an interior of the enclosure. The method also includes tightening a locknut against a threaded portion of the second end of the gland connector from the interior of the enclosure until the locknut engages an interior surface of the enclosure.

These and other aspects of the invention will become apparent from the following description. In the description, reference is made to the accompanying drawings which form a part hereof, and in which there is shown embodiments of the invention. Such embodiments do not necessarily represent the full scope of the invention and reference is made therefore, to the claims herein for interpreting the scope of the invention.

BRIEF DESCRIPTION OF THE DRAWINGS

The present disclosure will hereafter be described with reference to the accompanying drawings, wherein like reference numerals denote like elements.

DETAILED DESCRIPTION

Before the present invention is described in further detail, it is to be understood that the invention is not limited to the particular aspects described. It is also to be understood that the terminology used herein is for the purpose of describing particular aspects only, and is not intended to be limiting. The scope of the present invention will be limited only by the claims. As used herein, the singular foul's "a", "an" and "the" include plural aspects unless the context clearly dictates otherwise.

It should be apparent to those skilled in the art that many additional modifications beside those already described are possible without departing from the inventive concepts. In interpreting this disclosure, all terms should be interpreted in the broadest possible manner consistent with the context. Variations of the term "comprising", "including", or "having" should be interpreted as referring to elements, components, or steps in a non-exclusive manner, so the referenced elements, components, or steps may be combined with other elements, components, or steps that are not expressly referenced. Aspects referenced as "comprising", "including", or "having" certain elements are also contemplated as "consisting essentially of" and "consisting of" those elements, unless the context clearly dictates otherwise. It should be appreciated that aspects of the disclosure that are described with respect to a system are applicable to the methods, and vice versa, unless the context explicitly dictates otherwise.

Numeric ranges disclosed herein are inclusive of their endpoints. For example, a numeric range of between 1 and 10 includes the values 1 and 10. When a series of numeric ranges are disclosed for a given value, the present disclosure expressly contemplates ranges including all combinations of the upper and lower bounds of those ranges. For example, a numeric range of between 1 and 10 or between 2 and 9 is intended to include the numeric ranges of between 1 and 9 and between 2 and 10.

Figure 3:
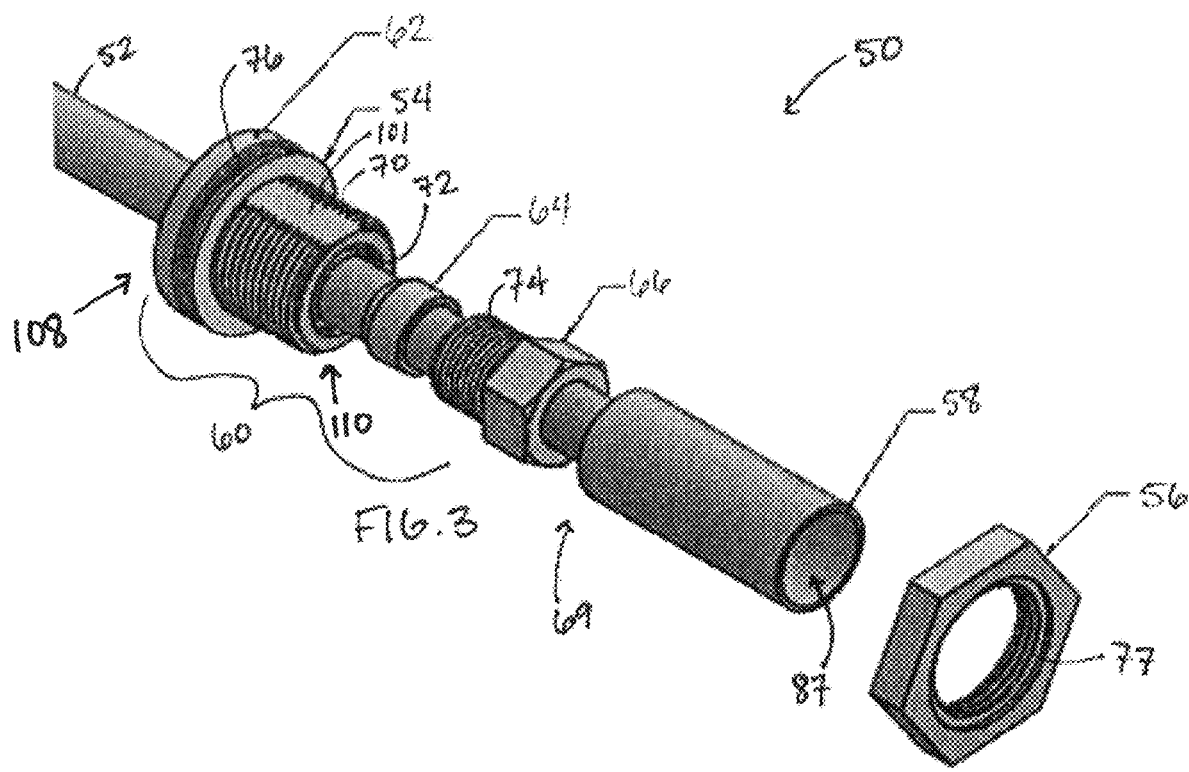
FIG. 3 is a perspective view of a cable sealing gland, according to one embodiment of the invention, placed on a cable.
Figure 4:
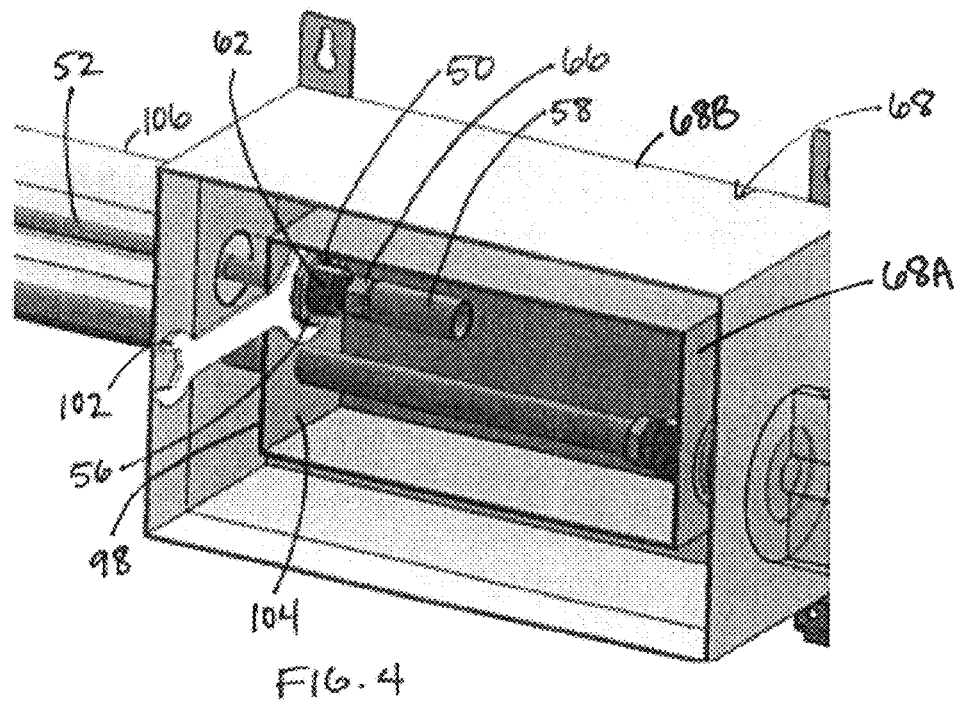
FIG. 4 is a perspective view of a cable with the cable sealing gland of FIG. 3 secured to an electrical enclosure.

FIG. 3 illustrates a cable sealing gland 50, according to one embodiment of the invention, coupled to a cable 52. As shown in FIG. 3, the cable sealing gland 50 includes a sealing washer 54, a locknut 56, a sealing pot 58, and a gland connector 60 with a cable gland body 62, a ferrule 64, and a compression bolt 66. Generally, the cable sealing gland 50 can be used to terminate and install a cable 52 in an electrical enclosure 68, as shown in FIG. 4. More specifically, the sealing pot 58 can be used to seal a terminated end 69 of the cable 52, while the gland connector 60, the washer 54, and the locknut 56 can be used to secure the cable 52 to the enclosure 68.

Figure 5:
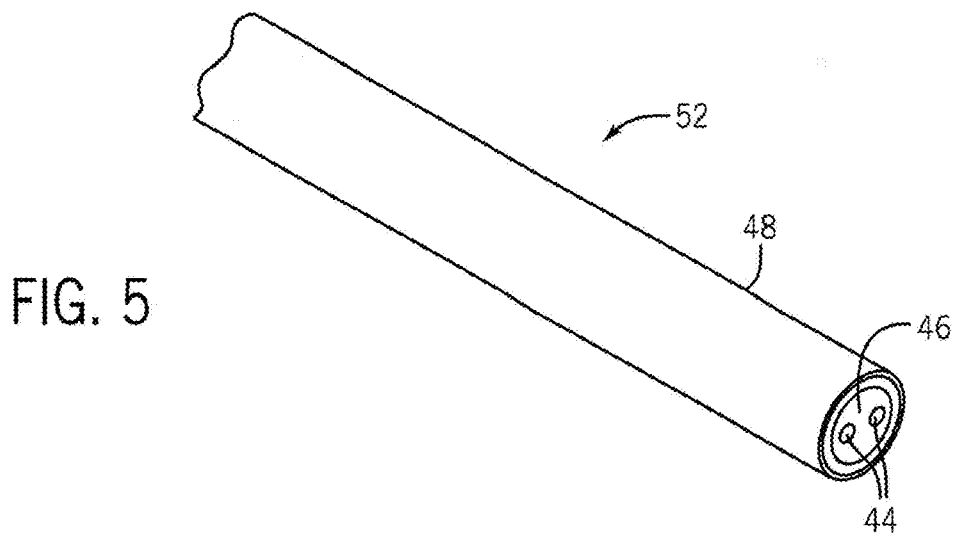
FIG. 5 is a partial perspective view of a cable for use with the cable sealing gland of FIG. 3.

In some embodiments, the cable sealing gland 50 can be used with fire-rated, mineral insulated (MI) cables 52. For example, as shown in FIG. 5, an MI cable 52 can include one or more conductors 44 surrounded by mineral insulation 46, such as magnesium oxide powder, that is tightly packed inside a conductive, typically copper or steel, tubular sheath 48. Furthermore, in some embodiments, the cable sealing gland 50 can be used with Pyrotenax® MI wiring cables. In other embodiments, however, the cable sealing gland 50 can be used with other cables.

The cable sealing gland 50 can therefore be sized and configured based on the size of the respective cable 52. For example, as shown in FIG. 3, components of the gland connector 60 can be sized, to fit together so that the gland connector 60 can slide over an end 69 of the cable 52. The cable gland body 62 can include a first, or proximal, end 108 and a second, or distal, end 110. Generally, as shown in FIG. 4 and further described below, the first end 108 can be sized to remain outside the enclosure 68 when the gland connector 60 is inserted through a hole 96 of the enclosure 68 and a second end 110 can be sized to extend into an interior of the enclosure 68 when the gland connector 60 is inserted through the hole 96.

The cable gland body 62 can also include external threading 70 and internal threading 72 adjacent the second end 110 and can be sized to slide or fit over the cable 52 (e.g., so that the internal threading 72 surrounds the sheath 48 of the cable 52). The cable gland body 62 can also include an internal diameter adjacent the second end 110 sized to receive the ferrule 64 and a threaded portion 74 of the compression bolt 66 when the components are slid over the cable 52 (e.g., such that the ferrule 64 and the threaded portion 74 are positioned between the cable sheath 48 and the gland body 62). More specifically, the ferrule 64 can be sized to fit over the cable 52 and to be inserted into the cable gland body 62 (e.g., into the second end 110 and between the cable 52 and cable gland body 62). The compression bolt 66 can be sized to fit over the cable 52 and be inserted into the cable gland body 62 (e.g., into the second end 110 beside the ferrule 64) to engage the cable gland body 62. That is, the threading 74 of the compression bolt 66 can engage the internal threading 72 of the cable gland body 62 when the compression bolt 66 is inserted into the cable gland body 62. Tightening the compression bolt 66 against the internal threading 72 of the cable gland body 62 pushes the ferrule 64 further into the cable gland body 62 and, thus, compresses the ferrule 64 between the cable gland body 62 and the compression bolt 66. As shown in FIG. 3, the compression bolt 66 can include a hexagonal-shaped bolt head, allowing a user to tighten or loosen the compression bolt 66 with a wrench or other tool. Thus, to assemble the gland connector 60, the ferrule 64 is inserted into second end 110 of the cable gland body 62 and then the compression bolt 66 is threaded into the second end 110 of the cable gland body 62. In this assembled state, the first end 108 and second end 110 of the cable gland body 62 may be considered a first and second end of the gland connector 60.

Additionally, the sealing washer 54 can be sized to slide over the sealing pot 58 and the external threading 70 of the cable gland body 62 and abut a shoulder portion 76 at the first end 108 of the cable gland body 62. In other words, the sealing washer 54 can include an internal diameter larger than a diameter of the portion of the gland body 62 containing the external threading 70 at the second end 110, but smaller than a diameter of the shoulder portion 76 at the first end 108. The locknut 56 can be sized to fit over the sealing pot 58 and the second end 110 of cable gland body 62, but not the shoulder portion 76 at the first end 108. The locknut 56 can be further sized so that internal threading 77 of the locknut 56 engages the external threading 70 of the cable gland body 62. As shown in FIG. 3, the locknut 56 can include a hexagonal shape, allowing a user to tighten or loosen the locknut 56 with a wrench or other tool.

Figure 6:
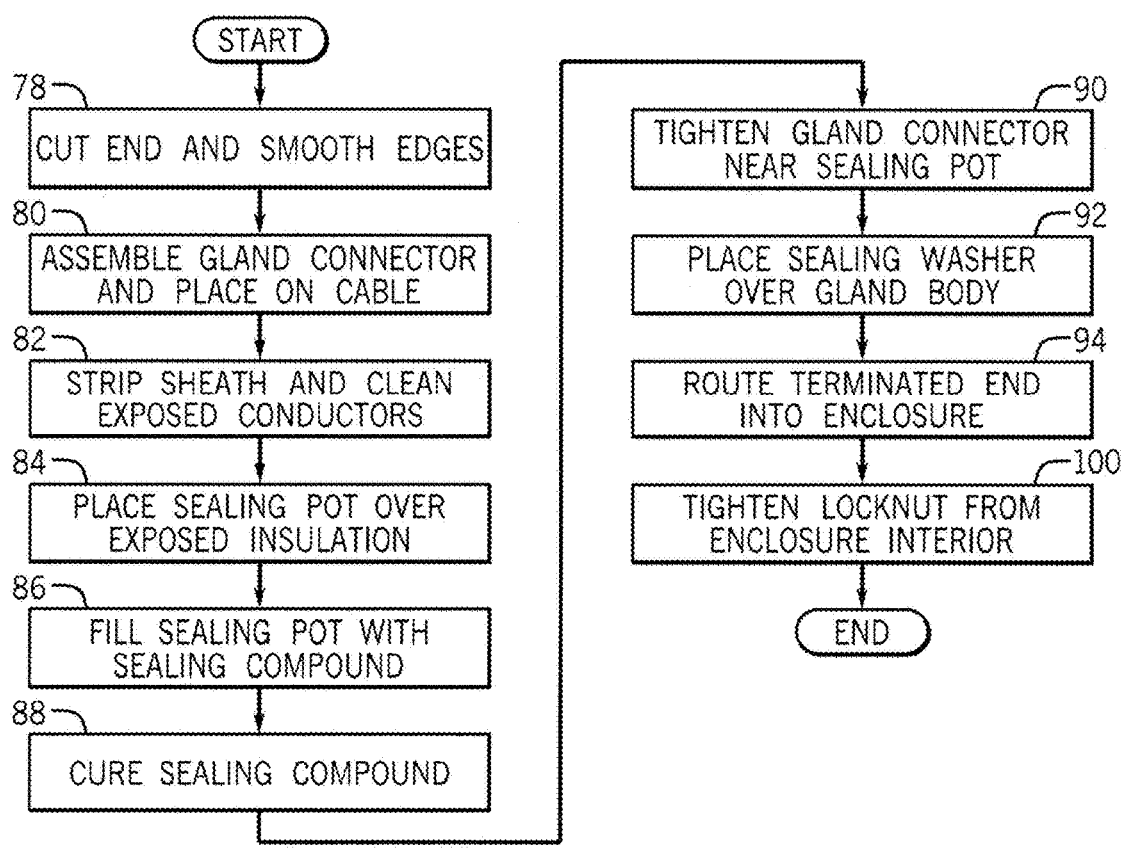
FIG. 6 is a flowchart describing a method for terminating and installing a cable in an enclosure using the cable sealing gland of FIG. 3.

The above components can fit together in order to secure the cable 52 to an electrical enclosure 68, for example using the method of FIG. 6. More specifically, FIG. 6 illustrates a method, according to some embodiments, for terminating a cable 52 and installing the cable 52 in the electrical enclosure 68. First, at step 78, an end 69 of the cable 52 is cut (e.g., with a hacksaw) and the cut edges are filed smooth. At step 80, the gland connector 60 is loosely assembled, placed on the cable 52, and slid along the cable 52 a first distance away from the cable end 69. For example, gland connector 60 is loosely assembled by inserting the ferrule 64 into the cable gland body 62 and then loosely threading, but not fully tightening, the compression bolt 66 into the cable gland body 62 enough to keep the components together, but not to fully compress the ferrule 64. At step 82, a length of the cable 52 (e.g., from the end 69 to a second distance away from the end 69) is stripped of its sheath 48, for example with a sheath stripping tool. The mineral insulation 46 is also removed along that length so that the conductor(s) 44 are exposed and can be cleaned off. At step 84, the sealing pot 58, which may be sized to fit over the cable 52, is placed over the exposed conductors 44 and slid up the cable 52 until the sealing pot 58 reaches the remaining sheath 48 (e.g., so that a portion of the sheath 48 extends into the sealing pot 58). At step 86, an open end 87 of the sealing pot 58 (i.e., the end facing the cable end 69, as shown in FIG. 3) is filled with a sealing compound or epoxy and a spacer disk (not shown) and anchoring beads (not shown) may cover the open end 87 of sealing pot 58.

Figure 7:
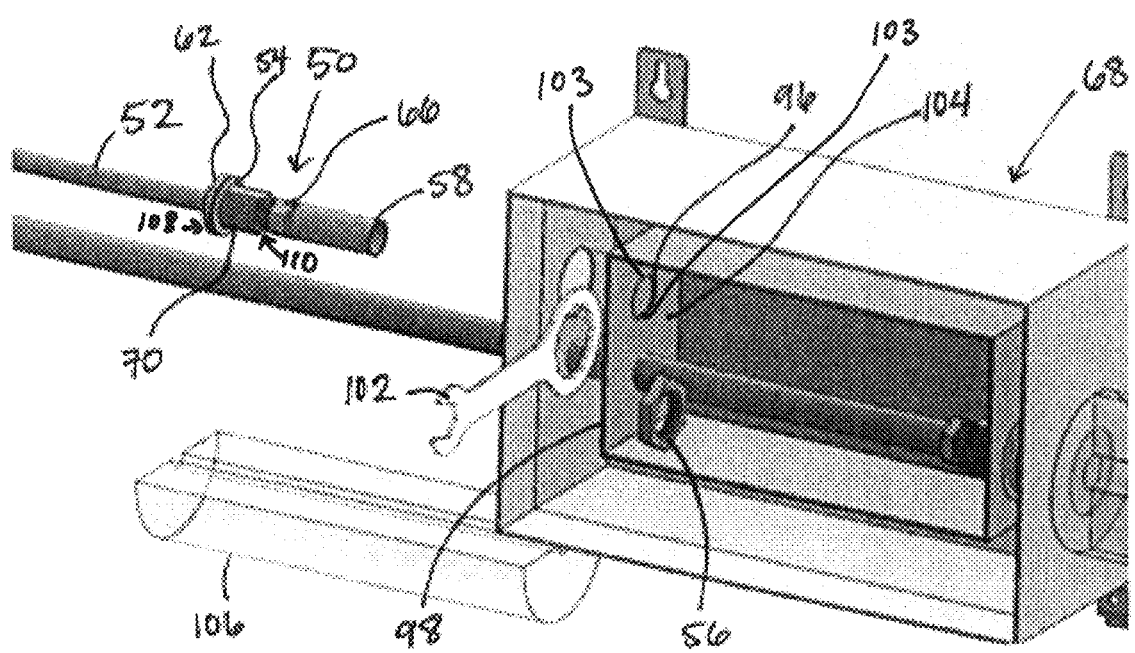
FIG. 7 is a perspective view of a cable with the cable sealing gland of FIG. 3 and an electrical enclosure.

After the sealing compound is set or cured at step 88, the cable 52 is properly sealed and can be inserted into and secured to an electrical enclosure 68, as shown in FIGS. 4 and 7. More specifically, at step 90, the gland connector 60 is positioned along the cable 52 adjacent to the sealing pot 58 at the terminated end 69 of the cable 52 (e.g., adjacent to an end of the sealing pot 58 opposite the open end 87) and the components are tightened to secure the gland connector 60 in place on the cable 52. In other words, the compression bolt 66 is rotated or threaded toward the cable gland body 62 in order to tighten the engagement and compress the ferrule 64 against the cable 52, thus securing the gland connector 60 on the cable 52. In some embodiments, the gland connector 60 can be positioned a set distance away from the sealing pot 58, as further described below. Also, this distance may be equal to the first distance described above with respect to step 80, or a shorter distance.

At step 92, the sealing washer 54 is slid over the sealing pot 58 and placed over the cable gland body 62 so that it abuts the shoulder 76 of the cable gland body 62. At step 94, as shown in FIG. 7, the terminated cable end 69 is routed through one or more enclosure wall holes 96 so that the cable end 69 extends into an interior of the electrical enclosure 68. For example, the terminated cable end 69 is routed through the enclosure wall holes 96 until a portion of the cable gland body 62 resides within the interior of the electrical enclosure 68 and the sealing washer 54 abuts or engages an outer surface 98 of the electrical enclosure 68 (that is, an outer surface 98 of a wall of the electrical enclosure 68). In other words, the terminated cable end 69 is routed through the enclosure wall holes 96 until the second end 110 of the gland connector 60 resides within the interior of the electrical enclosure 68 and the first end 108 of the gland connector 60 is positioned adjacent the outer surface 98 of the electrical enclosure 68. When the enclosure 68 is a double-walled enclosure (e.g., having an interior enclosure 68A and an exterior enclosure 68B as shown in FIGS. 4 and 7), the terminated cable end 69 can be routed through the enclosure wall holes 96 until the sealing washer 54 (which, as noted above, is positioned against the shoulder portion 76 at the first end 108 of the gland body 62) abuts an outer surface 98 of the interior enclosure 68A.

At step 100, as shown in FIG. 4, the locknut 56 can be threaded onto the external threading 70 at the second end 110 of the cable gland body 62 from inside the enclosure 68, for example using a sheet metal spanner or wrench 102. The locknut 56 can be tightened around the cable gland body 62 until it reaches or engages an interior surface 104 of the enclosure 68 to couple the gland connector 60 and, thus, the cable 52 to the enclosure 68. Because the gland connector 60 is keyed to the interior enclosure wall hole 96, the cable 52 does not rotate when the locknut 56 is threaded onto the cable gland body 62. More specifically, as shown in FIG. 3, the threaded portion 70 of the cable gland body 62 can include one, two, or more flat portions 101, (e.g., a flat portion 101 at the top, as shown in FIG. 3, and another flat portion 101 at the bottom, not shown in FIG. 3). These flat portions 101 can engage with mating flat portions 103 of the hole 96 of the enclosure 68, as shown in FIG. 7 (e.g., formed by a factory-made custom knockout punch). This engagement can prevent the cable 52 from rotating when the locknut 56 is threaded onto the cable gland body 62. Thus, in some embodiments, prior to inserting the cable end 69 through the hole 96 at step 94, the flat portions 101 of the gland connector 60 can be aligned with the flat portions 103 of the hole 96. In some applications, where the enclosure hole 96 does not include a custom knockout, the antirotation effect can instead be accomplished using a second wrench outboard of the locknut wrench 102 to hold the flat portions 101, thus securing the second end 110, while tightening the locknut 56.

Also, in some embodiments, as shown in FIGS. 4 and 7, insulation 106 may be added around the cable 52 outside the enclosure 68. The insulation 106 does not affect installation of the cable sealing gland 50 because the components that need to be accessed for tightening are positioned inside the enclosure 68. Thus, the insulation 106 can be added before or after the locknut 56 is tightened against the cable gland body 62.

While the above method steps are shown and described in a specific order, other embodiments of the invention can include methods having a different order of method steps or only some of the above-described method steps. Additionally, in some applications, certain steps may be executed in the factory while other steps in the field. For example, the cable sealing gland 50 and the sealing pot 58 can be factory installed, while a field installer can place the cable sealing gland 50 in the enclosure 68 and tighten the locknut 56. In other words, steps 78-92 may be completed in a factory while steps 94 and 100 may be completed in the field. Such a process can save time for the installer. Additionally, the factory installation steps can permit a fixed axial positioning of the gland 50 relative to the sealing pot 58 (e.g., a fixed distance of cable 52 between the gland 50 and the sealing pot 58). For a fire test, as described below, it can be advantageous to have the sealing pot 58 positioned as far into the interior of the enclosure 68 as possible because such positioning can slow down heat gain by the sealing pot 58. Providing a fixed length between the cable sealing gland 50 and the sealing pot 58 can help ensure this advantageous positioning. Accordingly, in some embodiments, a pre-set cable sealing gland 50 can include the sealing pot 58 on a terminated end 69 of cable 52 and a gland connector 60 installed (e.g., already tightened) on the cable 52 a predetermined distance away from the sealing pot 58.

Figure 1:
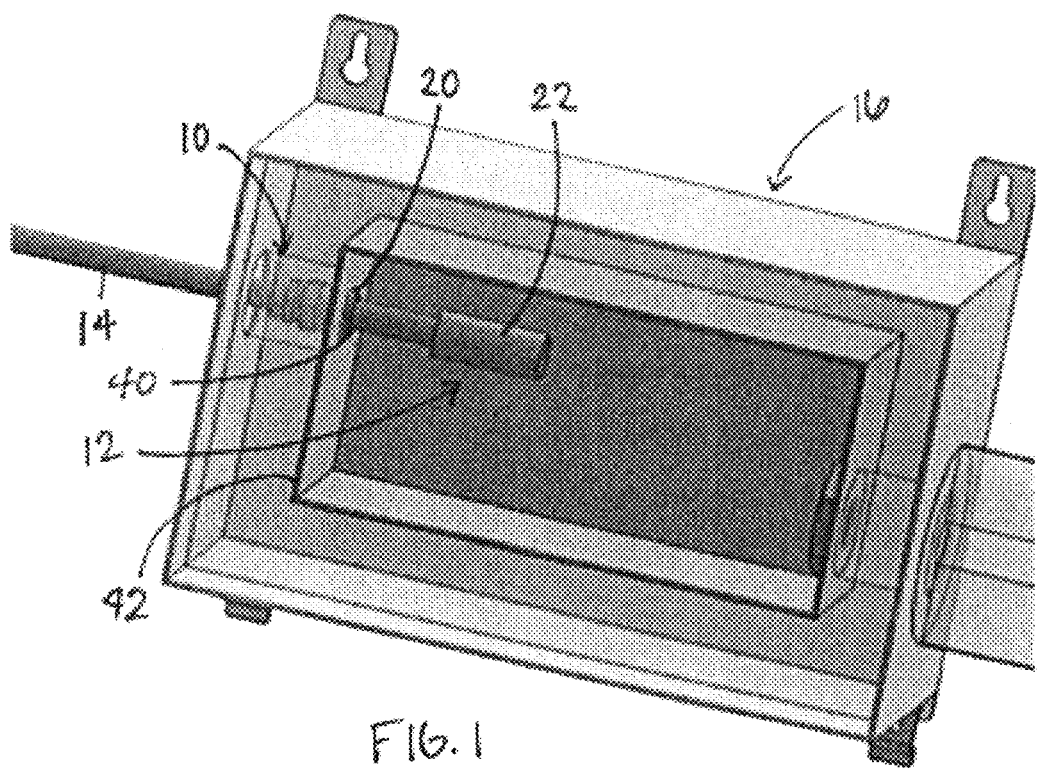
FIG. 1 is a perspective view of a cable secured to an electrical enclosure with an existing cable sealing gland.
Figure 2A:
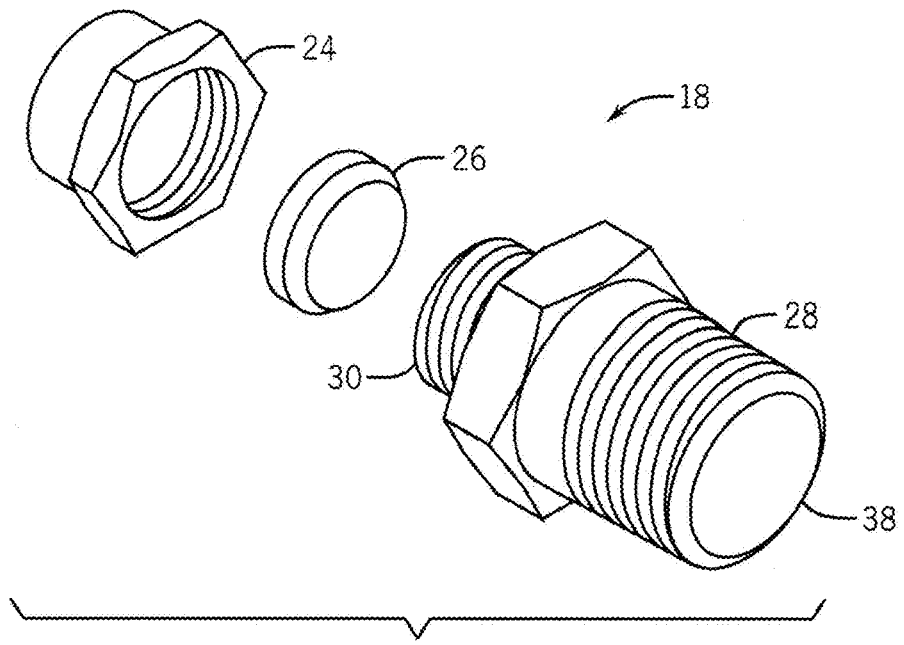
FIG. 2A is a perspective exploded parts view of an existing cable gland connector.
Figure 2B:
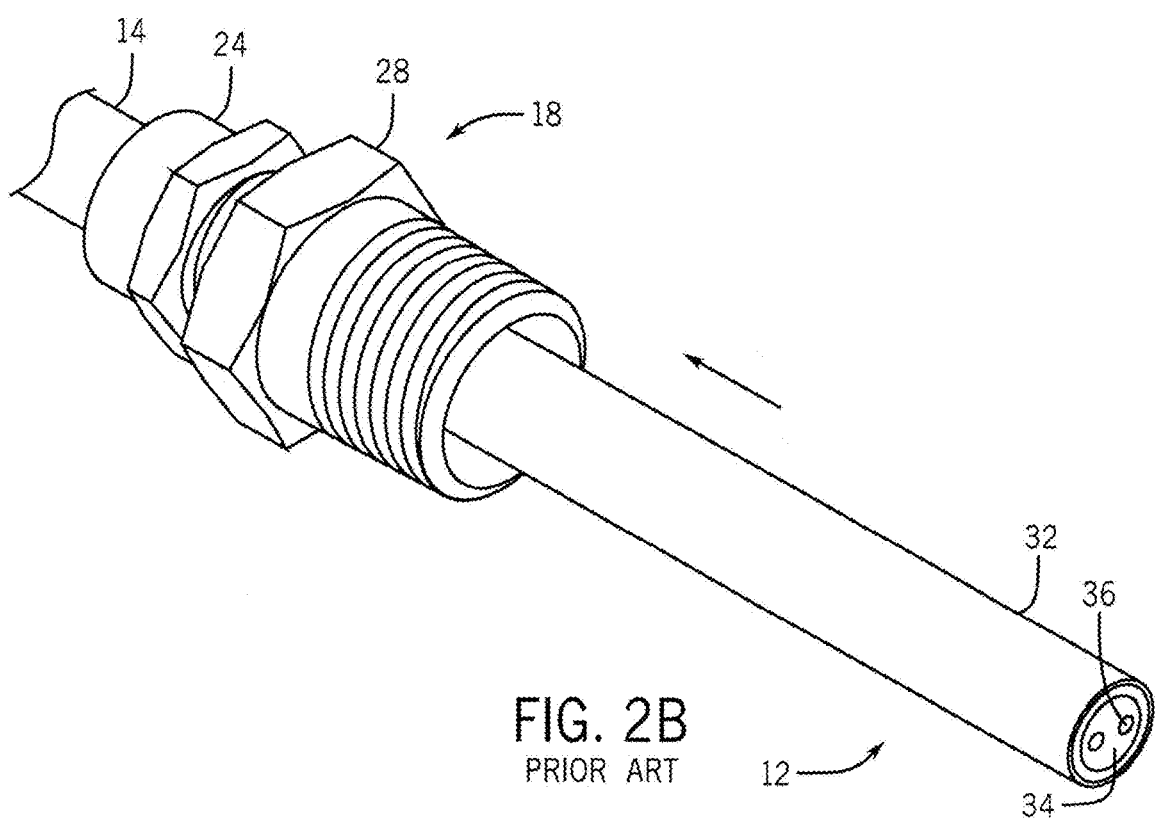
FIG. 2B is a perspective view of an existing cable gland connector placed on a cable.

Referring back to FIG. 4, when installed, the cable sealing gland 50 generally resides within the interior of the enclosure 68. More specifically, the entire gland connector 60, except the shoulder portion 76 of the first end 108 resides within the interior of the enclosure 68. Furthermore, a majority of the cable sealing gland 50, that is, all components except for shoulder portion 76 of the cable gland body 62 and the sealing washer 54, reside within the interior of the enclosure 68. Furthermore, all moving components for completing installation, that is, coupling the cable 52 to the enclosure 68 (e.g., the locknut 56), are located and accessed within the interior of the enclosure 68. This interior gland configuration provides multiple benefits over existing externally residing cable gland connectors, such as installation benefits and thermal benefits. For example, by placing the compression bolt 66 internally (e.g., at the second end 110), better tool access is afforded to install the gland 50. In a fire-rated enclosure, the enclosure exterior may be surrounded by up to two inches or more of thermal insulation 106. Using an external cable gland connector, such as the gland connector 18 shown in FIG. 1, the insulation makes accessing exterior gland nuts or bolts difficult, as the connector 18 would be recessed in the insulation. On the other hand, as described above, such insulation would not affect installation or tightening of the present interior gland connector 60.

Figure 8:
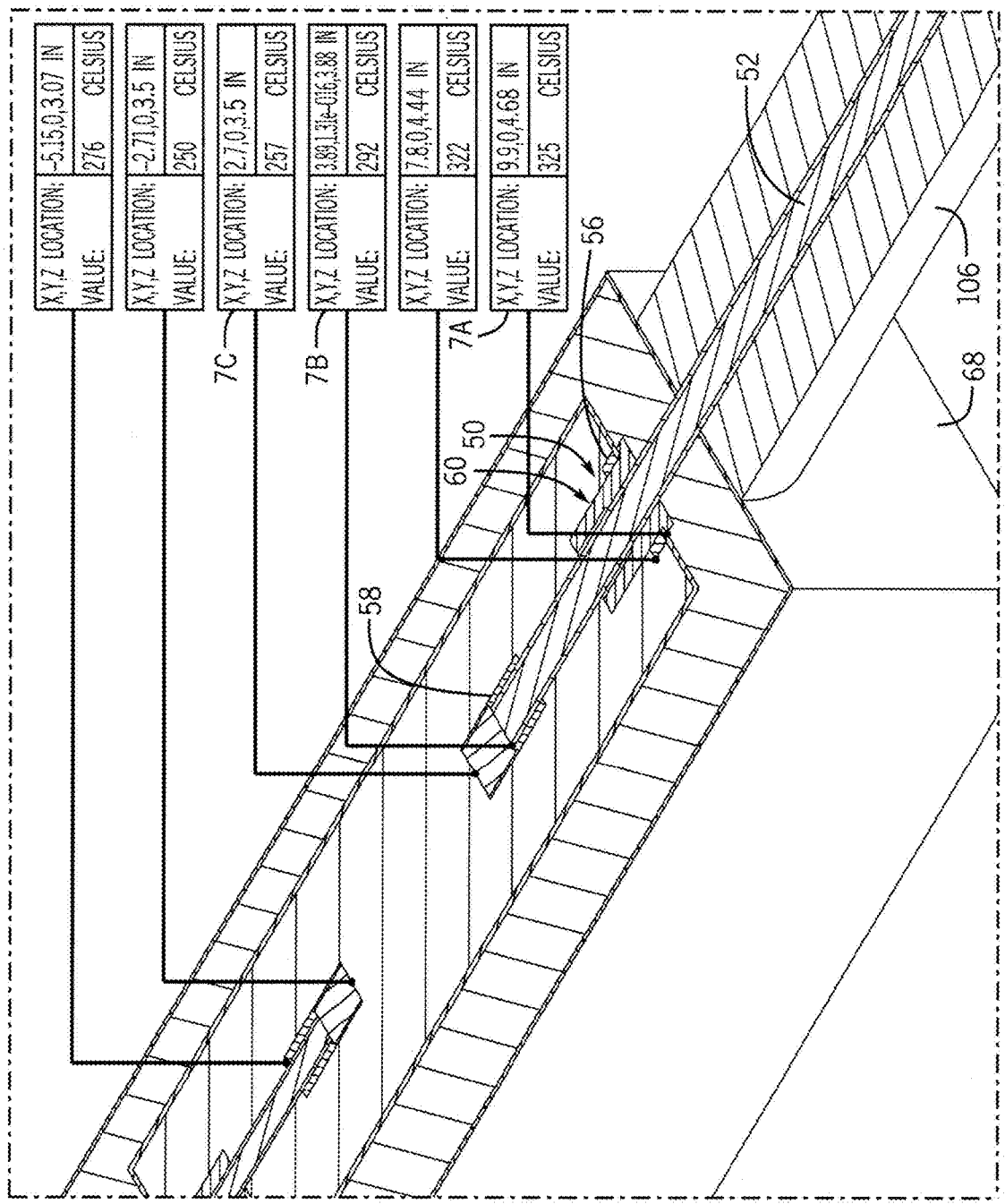
FIG. 8 is a cross-sectional view of an internally residing cable sealing gland of embodiments of the invention when secured to an electrical enclosure and exposed to heat, and thermal finite element analysis (FEA) results showing thermal performance of the cable sealing gland.
Figure 9:
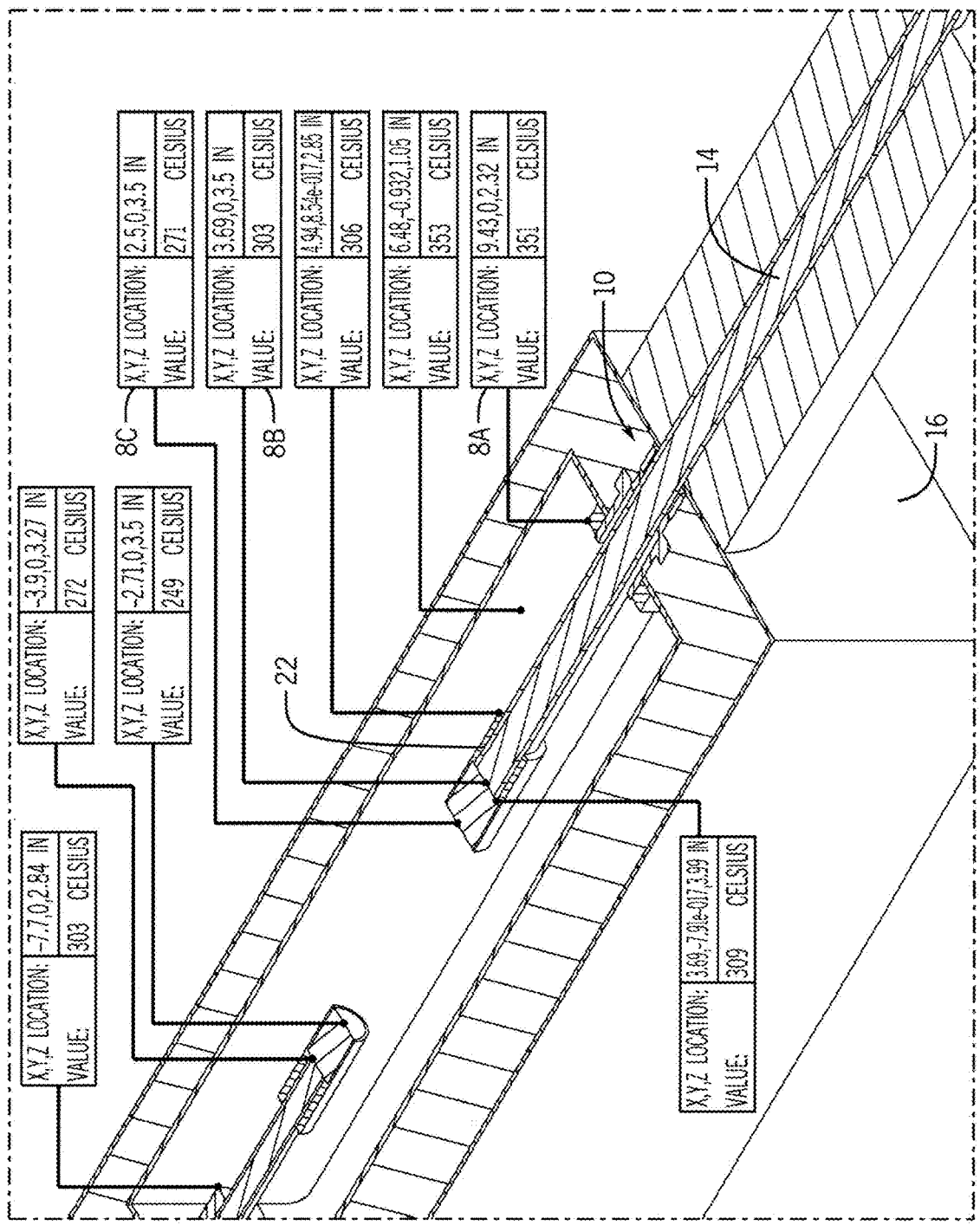
FIG. 9 is a cross-sectional view of a conventional externally residing cable sealing gland when secured to an electrical enclosure and exposed to heat, and thermal FEA results showing thermal performance of the cable sealing gland.

In another example, the internal mass of the present cable sealing gland 50 (i.e., the mass residing inside to the enclosure 68) can slow the temperature rise of the cable 52 in a fire situation. In other words, in a fire situation, a cable 52 using the present cable sealing gland 50 would heat slower than a cable 14 using an existing cable sealing gland 10. For example, FIGS. 8 and 9 illustrate results of thermal finite element analyses (FEA) showing thermal performance of an internally residing cable sealing gland 50 of embodiments of the invention and an existing externally residing cable sealing gland 10, respectively, when secured to an electrical enclosure 68 and exposed to heat. As shown in FIGS. 8 and 9, for example, near the interior enclosure wall, node 7A of the interior cable gland 50 measures 325 degrees Celsius, whereas node 8A of the existing cable gland 10 measures 351 degrees Celsius. At the terminated end of the cable 52, 14, node 7B of the interior cable gland 50 measures 292 degrees Celsius, whereas node 8B of the existing cable gland 10 measures 303 degrees Celsius. At the open end of the sealing pot 58, 22, node 7C of the interior cable gland 50 measures 257 degrees Celsius, whereas node 8C of the existing cable gland 10 measures 271 degrees Celsius. Accordingly, all interior components of the cable 52 and the interior cable sealing gland 50 (shown in FIG. 8) remain cooler than the interior components of the cable 14 and the existing cable sealing gland 10 (shown in FIG. 9) when exposed to heat. As a result, the present cable sealing gland 50 can prolong the useful life of the insulation system used outside the enclosure 68 and better enable the insulation 106 and the cable 52 to survive a fire.

According to another example, the present cable sealing gland 50 and an existing cable sealing gland 10 were subjected to a one-hour fire test under UL 2196, which applies heat at gradually increasing temperatures over time, reaching 1700 degrees Fahrenheit at one hour. Temperatures were sensed at the sealing pot 58, 22 of each respective cable sealing gland 50, 10 via thermocouples. At one hour, the sealing pot 58 of the present cable sealing gland 50 reached 308° C. (587° F.), while the sealing pot 22 of the existing cable gland 10 reached 349° C. (660° F.). The results of this test illustrate that the present cable sealing gland 50 may act as a thermal mass and/or heat sink and remain cooler under fire conditions compared to the existing cable sealing gland 10.

Accordingly, embodiments of the present invention provide a cable sealing gland 50 for terminating and coupling MI cables to electrical enclosures. The present cable sealing gland 50 is easier to install and access compared to existing cable sealing glands and also better enables the MI cables and surrounding insulation to survive a fire. In some embodiments, one or more components of the cable sealing gland 50 may be sold together as a termination assembly or termination kit. Furthermore, while the cable sealing gland components are shown and described herein as having specific relative sizes and interlocking configurations, it is contemplated within other embodiments of the invention to provide an internally residing cable sealing gland with other types of components.

While the invention has been illustrated and described in detail in the foregoing drawings and description, the same is to be considered as illustrative and not restrictive in character, it being understood that only illustrative embodiments thereof have been shown and described and that all changes and modifications that come within the spirit of the invention are desired to be protected. For example, any of the features or functions of any of the embodiments disclosed herein may be incorporated into any of the other embodiments disclosed herein.

What is claimed is:

1. A cable sealing gland for securing a cable to an enclosure, the cable sealing gland comprising:
    a gland connector configured to be coupled to the cable, the gland connector including
        a cable gland body sized to fit over the cable, the cable gland body including a first end sized to remain outside the enclosure when the gland connector is inserted through a hole of the enclosure and a second end sized to extend into an interior of the enclosure when the gland connector is inserted through the hole,
        a ferrule sized to fit over the cable inside the cable gland body, and
        a compression bolt sized to fit over the cable and configured to engage the cable gland body to compress the ferrule onto the cable,
        wherein the cable gland body includes internal threading at the second end and the compression bolt includes threading configured to engage the internal threading; and
    a locknut configured to engage the cable gland body and engage an interior surface of the enclosure to couple the gland connector to the enclosure when the gland connector is inserted through the hole of the enclosure.

2. The cable sealing gland of claim 1 and further comprising a washer sized to fit over the second end of the cable gland body and to engage an outer surface of the enclosure when the gland connector is inserted through the hole of the enclosure.

3. The cable sealing gland of claim 2, wherein the first end of the cable gland body includes a shoulder portion, and the washer is configured to abut the shoulder portion when the gland connector is inserted through the hole of the enclosure.

4. The cable sealing gland of claim 1 and further comprising a sealing pot sized to fit over an end of the cable a distance from the gland connector.

5. The cable sealing gland of claim 1, wherein the cable is a mineral insulated cable.

6. The cable sealing gland of claim 1, wherein the cable gland body includes flat portions at the second end configured to align with flat portions of the hole of the enclosure when the gland connector is inserted through the hole of the enclosure.

7. The cable sealing gland of claim 1, wherein the enclosure is an interior enclosure of a double-walled enclosure.

8. The cable sealing gland of claim 1, wherein the locknut includes threading configured to engage external threading of the cable gland body.

9. A method of securing a terminated end of a cable to an enclosure, the method comprising the steps of:
    providing a gland connector with a cable gland body, a ferrule, and a compression bolt;
    assembling the gland connector by placing the ferrule into a second end of the cable gland body and threading the compression bolt into the second end of the cable gland body;
    placing the gland connector over the cable a distance away from the terminated end;
    securing the gland connector onto the cable by tightening the compression bolt against the cable gland body;
    inserting the terminated end through a hole of the enclosure until a first end of the cable gland body is adjacent an outer surface of the enclosure and the second end of the cable gland body resides within an interior of the enclosure; and
    tightening a locknut against the second end of the cable gland body from the interior of the enclosure until the locknut engages an interior surface of the enclosure.

10. The method of claim 9 and further comprising sliding a washer over the cable gland body after securing the gland connector onto the cable.

11. The method of claim 10, wherein inserting the terminated end includes inserting the terminated end through the hole of the enclosure until the washer engages the outer surface of the enclosure.

12. The method of claim 9 and further comprising installing a sealing pot at the terminated end after placing the gland connector over the cable.

13. The method of claim 9 and further comprising aligning flat portions of the second end of the cable gland body with flat portions of the hole of the enclosure.

14. The method of claim 9 and further comprising securing the second end of the cable gland body while tightening the locknut to prevent rotation of the cable gland body.

15. A method of securing a terminated end of a cable to an enclosure, the cable including a gland connector with a ferrule, a cable gland body, and a compression bolt adjacent the terminated end, the method comprising the steps of:
    aligning flat portions of a second end of the gland connector with flat portions of a hole of the enclosure;
    inserting the terminated end of the cable through the hole of the enclosure until a first end of the gland connector is adjacent an outer surface of the enclosure and the second end of the gland connector resides within an interior of the enclosure,
    wherein inserting the terminated end of the cable through the hole includes inserting the entire gland connector, except a shoulder portion of the first end, into the enclosure; and
    tightening a locknut against a threaded portion of the second end of the gland connector from the interior of the enclosure until the locknut engages an interior surface of the enclosure.

16. The method of claim 15 and further comprising sliding a washer over the gland connector until the washer abuts the first end of the gland connector.

17. The method of claim 16, wherein inserting the terminated end includes inserting the terminated end through the hole of the enclosure until the washer engages the outer surface of the enclosure.

18. The method of claim 15 and further comprising securing the gland connector to the cable by compressing the ferrule between the cable gland body and the compression bolt.

* * * * *

UNITED STATES PATENT AND TRADEMARK OFFICE
CERTIFICATE OF CORRECTION

PATENT NO. : 10,923,897 B2  
APPLICATION NO. : 15/926939  
DATED : February 16, 2021  
INVENTOR(S) : Wesley Dong Page 1 of 1

It is certified that error appears in the above-identified patent and that said Letters Patent is hereby corrected as shown below:

In the Specification

Column 3, Line 58, "foul's" should read --forms--.

Signed and Sealed this  
Thirteenth Day of April, 2021

Drew Hirshfeld  
*Performing the Functions and Duties of the*  
*Under Secretary of Commerce for Intellectual Property and*  
*Director of the United States Patent and Trademark Office*